Patented Mar. 17, 1953

2,631,988

UNITED STATES PATENT OFFICE 2,631,988

MIXED PLASTICIZERS

Martin L. Fein, Riverside, N. J., and Charles H. Fisher, New Orleans, La., assignors to the United States of America as represented by the Secretary of Agriculture No Drawing. Application October 6, 1950,
Serial No. 188,860

12 Claims. (Cl. 260—30.4)

(Granted under Title 35, U. S. Code (1952), sec. 266)

This application is made under the act of March 3, 1883, as amended by the act of April 30, 1928, and invention herein described, if patented in any country, may be manufactured and used by the Government of the United States of America for governmental purpose throughout the world without the payment to us of any royalty thereon.

This application is a continuation-in-part of our copending application Serial No. 787,261 filed November 20, 1947.

This invention relates to plastic compositions containing as a plasticizer a mixture of plasticizing agents including at least one ester of an alpha-acyloxypropionic acid.

We have found that esters corresponding to the general formula

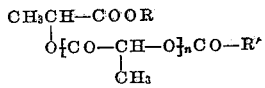

wherein R is an alkyl, cycloalkyl, alkoxyalkyl, haloalkoxyalkyl, alkoxyalkoxyalkyl, aralkyl or tetrahydrofurfuryl radical, R' is an alkyl containing from six to thirteen carbon atoms and $n$ is 0 or 1, can be blended with conventional plasticizing agents to improve the efficiency of the latter to plasticize polyvinyl plastics, especially polyvinyl chloride-acetate copolymers. We have also found that these mixed plasticizers impart lower brittle points to the plastic compositions, than the brittle points measured when the conventional plasticizers are used alone.

The esters corresponding to the aforesaid general formula and used as components of the mixed plasticizers, can be conveniently obtained by reacting the corresponding ester of alpha-hydroxypropionic or of lactyllactic acid, respectively, with acyl halides of higher saturated fatty acids, containing from seven to fourteen carbon atoms, preferably in the presence of a solvent or diluent, and an organic base capable of combining with the hydrogen halide liberated in the reaction. The esters so obtained are then blended, singly or in combination, with a phthalic or phosphoric acid ester plasticizer such as di-octyl phthalate or tricresyl phosphate or any other plasticizing agent compatible therewith and adapted for use as a modifying agent for polymeric vinyl ester plastics like polyvinyl chloride-acetate copolymers, and the resulting mixed plasticizer composition incorporated in the synthetic plastic material by milling or by dissolving the polymeric material and the mixed plasticizer in a mutual solvent and allowing the solvent to evaporate, or by any other conventional technique. Fillers, dyes, extenders, pigments and other compounding ingredients may be included if desired.

The plastic compositions of this invention can contain as plasticizer ingredient mixtures comprising ranging properties of alkyl, alkoxyalkyl, haloalkoxyalkyl, aralkyl or tetrahydrofurfuryl esters of acylated alpha-hydroxypropionic acid or of acylated lactyllactic acid, and plasticizers such as higher alkyl phthalates or triaryl esters of phosphoric acid, the ratios of the individual components of the plasticizer mixture can be varied within wide limits to meet plasticizing efficiency and brittle point requirements. Thus, for example, such mixed plasticizer containing from about 20 to about 80 percent of di-2-ethylhexyl phthalate or tricresyl phosphate, on the basis of the total weight of the plasticizer mixture, can be advantageously utilized as plasticizing agent for polymers consisting of copolymerized vinyl chloride and vinyl acetate.

The following examples illustrate the invention. The plasticizing efficiency of the mixed plasticizers described in the specific examples, and of the individual components thereof, as measured by modulus at 100 percent elongation were determined on samples made by compounding 35 parts by weight of the plasticizing agent with 3.5 parts of the plasticizing agent with polyvinyl chloride-acetate copolymer (95% vinyl chloride, 5% vinyl acetate) using a procedure analogous to that described by Kent and Weaver (1947 India Rubber World, 115, 813–816). Brittle points of the corresponding plasticized compositions were determined by a procedure similar to that described by Selker et al., 1942 Industrial and Engineering Chemistry, 34, 157–160.

EXAMPLE I

Butyl lactyllactate laurate (B. P. 186°–190° C./1.2 mm., $n_D^{20}$ 1.4415, $d_4^{20}$ 0.9677) described in our copending application Serial No. 152,269 filed March 27, 1950, was mixed with an equal weight of tricresyl phosphate and the resulting mixture compounded with polyvinyl chloride-acetate copolymer. The plasticized composition thus obtained had the following characteristics:

100% modulus _____ 1760 p. s. i.
Brittle point _____ −11° C.

EXAMPLE II

A mixture consisting essentially of butyl lactate laurate and butyl lactyllactate laurate in the molecular proportions of approximately 2 to 1, was blended with an equal weight of tricresyl phosphate, and the resulting mixed plasticizing agent was compounded with polyvinyl chloride-acetate copolymer. The plasticized composition thus obtained had the following characteristics:

100% modulus _____ 1460 p. s. i.
Brittle point _____ −29° C.

The esters of alpha-acyloxypropionic acid shown in Table I, were compounded, singly and in admixture with dioctyl phthalate (di-2-ethylhexyl phthalate) or with tricresyl phosphate, with polyvinyl chloride-acetate copolymer and the modulus at 100 percent elongation and brittle point of each of the plasticized composition so obtained were determined. Some of the results thus obtained are shown in Table II through IV. The same characteristics of the corresponding compositions containing dioctyl phthalate and tricresyl phosphate as the sole plasticizing agent are also shown in Tables III and IV respectively.

*Table I.—Compounds corresponding to the general formula*

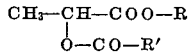

| Compound No. | R | R' |
|---|---|---|
| 1 | n-Butyl | n-Hexyl. |
| 2 | sec. Butyl | n-Octyl. |
| 3 | n-Butyl | Undecyl. |
| 4 | sec. Butyl | Do. |
| 5 | iso-butyl | Do. |
| 6 | 2-Ethyl-hexyl | Do. |
| 7 | 2-Ethoxy-ethyl | Do. |
| 8 | 2-Butoxy-ethyl | Do. |
| 9 | 2-(Butoxyethoxy)ethyl | n-Octyl. |
| 10 | do | Undecyl. |
| 11 | 2-Chloroethoxyethyl | n-Octyl. |
| 12 | Tetrahydrofurfuryl | n-Hexyl. |
| 13 | do | Undecyl. |
| 14 | Benzyl | Do. |
| 15 | Cyclohexyl | Do. |
| 16 | 4-methyl-2-pentyl | Do. |

The R of compound 9 is: $C_4H_3-O-CH_2-CH_2-O-CH_2-CH_2-$; that of compound 16 is:

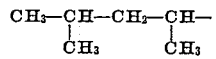

*Table II*

| Plasticizer Compound No. | Plasticized Composition | |
|---|---|---|
| | 100% Modulus, p. s. i. | Brittle Point, °C. |
| 1 | 2,900 | −32 |
| 2 | 1,700 | −39 |
| 3 | 1,170 | −67 |
| 4 | 1,270 | −62 |
| 5 | 1,220 | −51 |
| 9 | 1,110 | −56 |
| 11 | 1,110 | −46 |
| 12 | 910 | −33 |
| 13 | 1,110 | −42 |
| 14 | 1,380 | −46 |
| 15 | 1,320 | −42 |

*Table III*

| Example No. | Plasticizer—Blend of equal parts by weight of dioctyl phthalate and Compound No.— | Plasticized Composition | |
|---|---|---|---|
| | | 100% Modulus, p. s. i. | Brittle Point, °C. |
| III | 1 | 1,260 | −36 |
| IV | 2 | 1,170 | −47 |
| V | 3 | 1,190 | −44 |
| VI | 4 | 1,240 | −45 |
| VII | 5 | 1,240 | −43 |
| VIII | 6 | 1,390 | −53 |
| IX | 7 | 1,140 | −41 |
| X | 8 | 1,300 | −46 |
| XI | 9 | 1,170 | −44 |
| XII | 10 | 1,340 | −37 |
| XIII | 11 | 1,180 | −42 |
| XIV | 12 | 1,090 | −38 |
| XV | 13 | 1,260 | −38 |
| XVI | 14 | 1,180 | −38 |
| XVII | 16 | 1,370 | −48 |
| | Dioctyl phthalate | 1,500 | −33 |

*Table IV*

| Example No. | Plasticizer—Blend of equal parts by weight of tricresyl phosphate Compound No.— | Plasticized Composition | |
|---|---|---|---|
| | | 100% Modulus, p. s. i. | Brittle Point, °C. |
| XVIII | 3 | 1,170 | −41 |
| XIX | 4 | 1,325 | −42 |
| XX | 5 | 1,370 | −39 |
| XXI | 14 | 1,330 | −38 |
| XXII | 15 | 1,680 | −20 |
| XXIII | 16 | 1,485 | −27 |
| | Tricresyl Phosphate | 1,945 | −5 |

Essentially analogous results are obtained on using in place of the butyl lactyllactate laurate of Examples I and II other alkyl esters, or alkoxyalkyl, aralkyl or tetrahydrofurfuryl esters, of acylated lactyllactic acid; and on replacing the esters of alpha-acyloxypropionic acids used in Examples III–XXIII by other alkyl, alkoxyalkyl or alkoxyalkoxyalkyl esters of these acids, such as the corresponding ethyl, propyl, 2-ethylbutoxyethyl, 2-(2-methoxyethoxy)ethyl, and 2-(2-ethoxyethoxy)ethyl esters of alpha-acyloxypropionic acid.

We claim:

1. A composition comprising a polyvinyl chloride-acetate polymer plasticized with a plasticizer of the group consisting of dialkyl esters of phthalic acid and triaryl esters of phosphoric acid, having incorporated therein a material from the group consisting of compounds represented by the formulas:

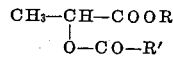

and

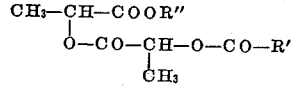

and mixtures thereof wherein R is a radical of the group consisting of alkyl, cycloalkyl, alkoxyalkyl, chloroalkoxyalkyl, alkoxyalkoxyalkyl, aralkyl and tetrahydrofurfuryl; R' is an alkyl group containing from six to thirteen carbon atoms and R" is an alkyl group and neither the R nor the R" groups has more than eight carbon atoms.

2. The composition of claim 1 wherein the plasticizer is di-2-ethylhexyl phthalate and having incorporated therein a compound corresponding to the general formula

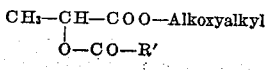

3. The combination of claim 1 wherein the plasticizer is di-2-ethylhexyl phthalate and having incorporated therein a compound corresponding to the general formula

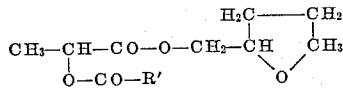

4. The composition of claim 1 wherein the plasticizer is di-2-ethylhexyl phthalate and having incorporated therein a compound corresponding to the general formula

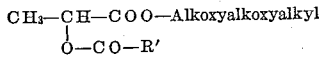

5. The composition of claim 1 wherein the plasticizer is tricresyl phosphate, and having incorporated therein a compound corresponding to the general formula

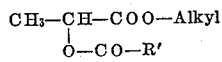

6. A composition comprising polyvinyl chloride-acetate copolymer plasticized with tricresyl phosphate and butyl lactate laurate.

7. A composition comprising polyvinyl chloride-acetate copolymer plasticized with a plasticizer of the group consisting of dialkyl esters of phthalic acid and triaryl esters of phosphoric acid, having incorporated therein a compound of the formula

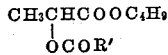

wherein R' is an alkyl group of six to eleven carbon atoms.

8. A composition comprising polyvinyl chloride-acetate copolymer plasticized with dioctyl phthalate and 2-butoxyethyl lactate laurate.

9. A composition comprising polyvinyl chloride-acetate copolymer plasticized with dioctyl phthalate and tetrahydrofurfuryl lactate heptanoate.

10. A composition comprising polyvinyl chloride-acetate copolymer plasticized with dioctyl phthalate and 2-(butoxyethoxy)ethyl lactate pelargonate.

11. A composition as in claim 7 wherein the plasticizer comprises dioctyl phthalate.

12. A composition as in claim 7 wherein the plasticizer is dioctyl phthalate and 2-ethyl-hexyl lactate laurate.

MARTIN L. FEIN.
CHARLES H. FISHER.

REFERENCES CITED

The following references are of record in the file of this patent:

UNITED STATES PATENTS

| Number | Name | Date |
|---|---|---|
| 2,122,716 | Graves | July 5, 1938 |
| 2,500,918 | Reuter et al. | Mar. 14, 1950 |